UNITED STATES PATENT OFFICE.

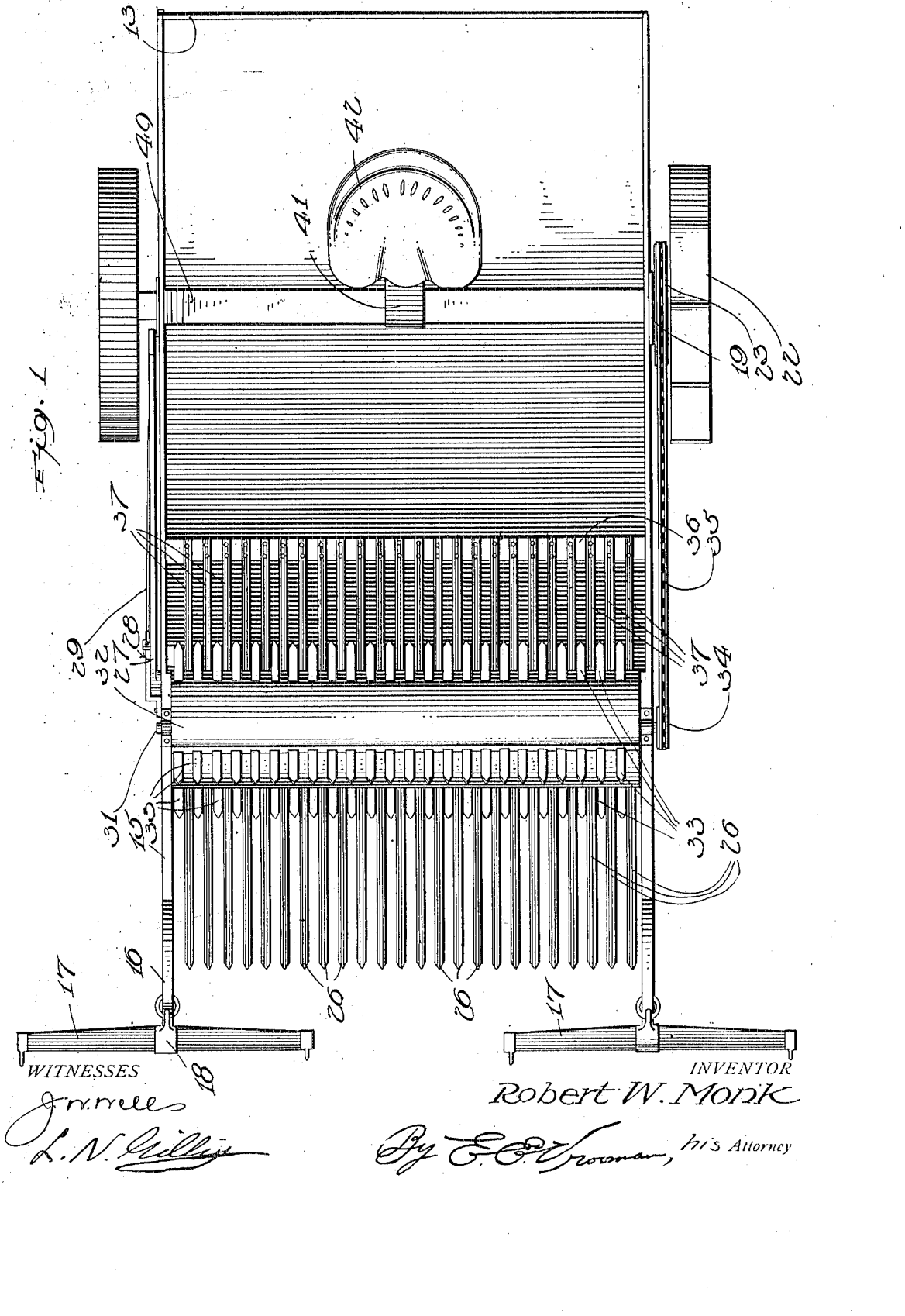

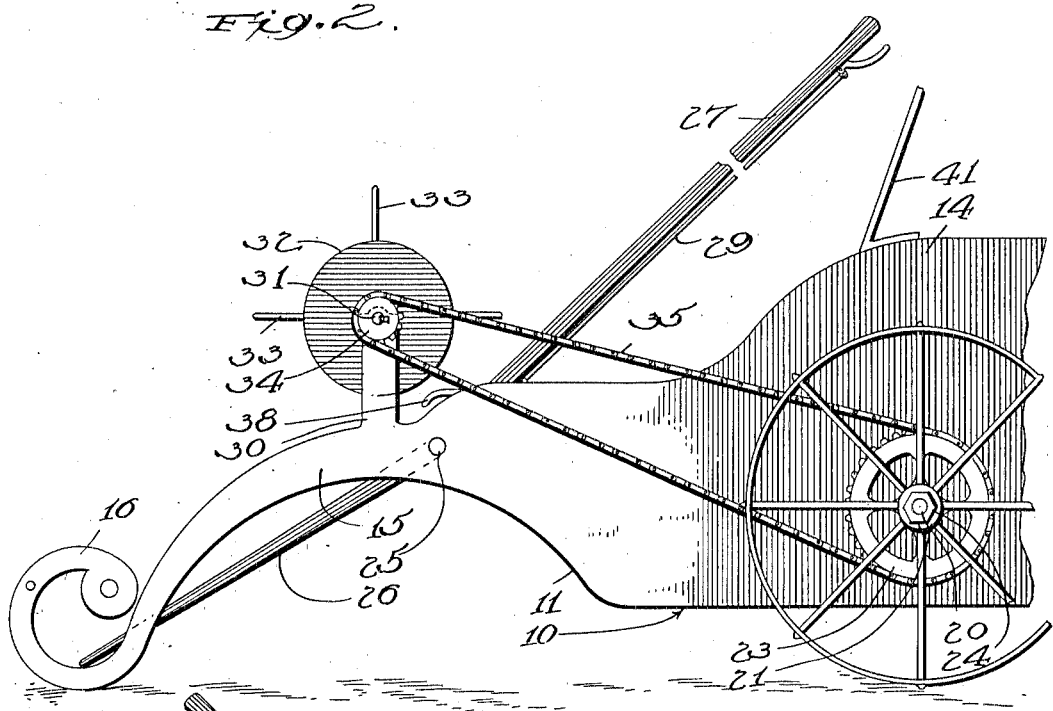
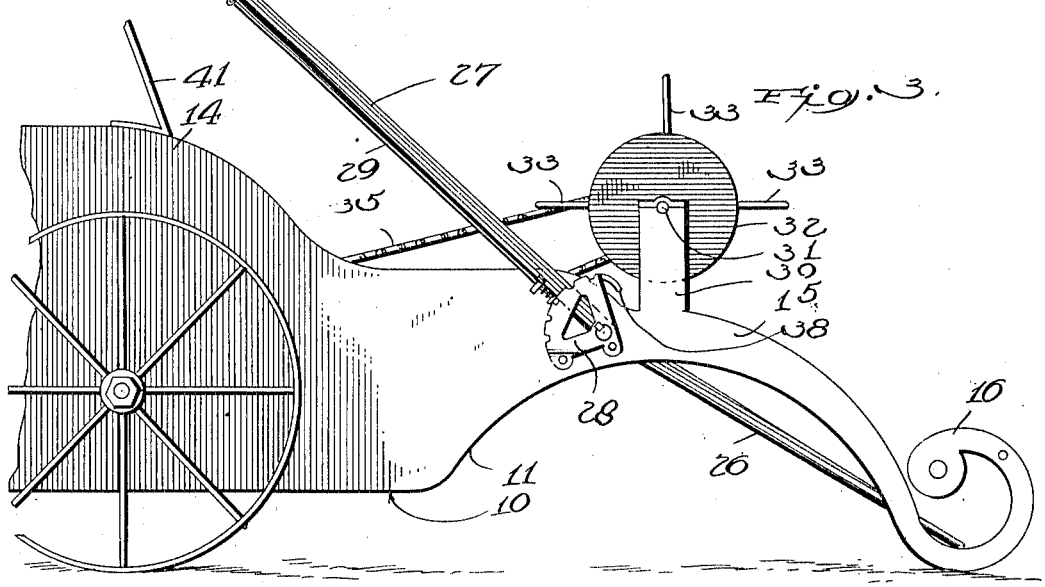

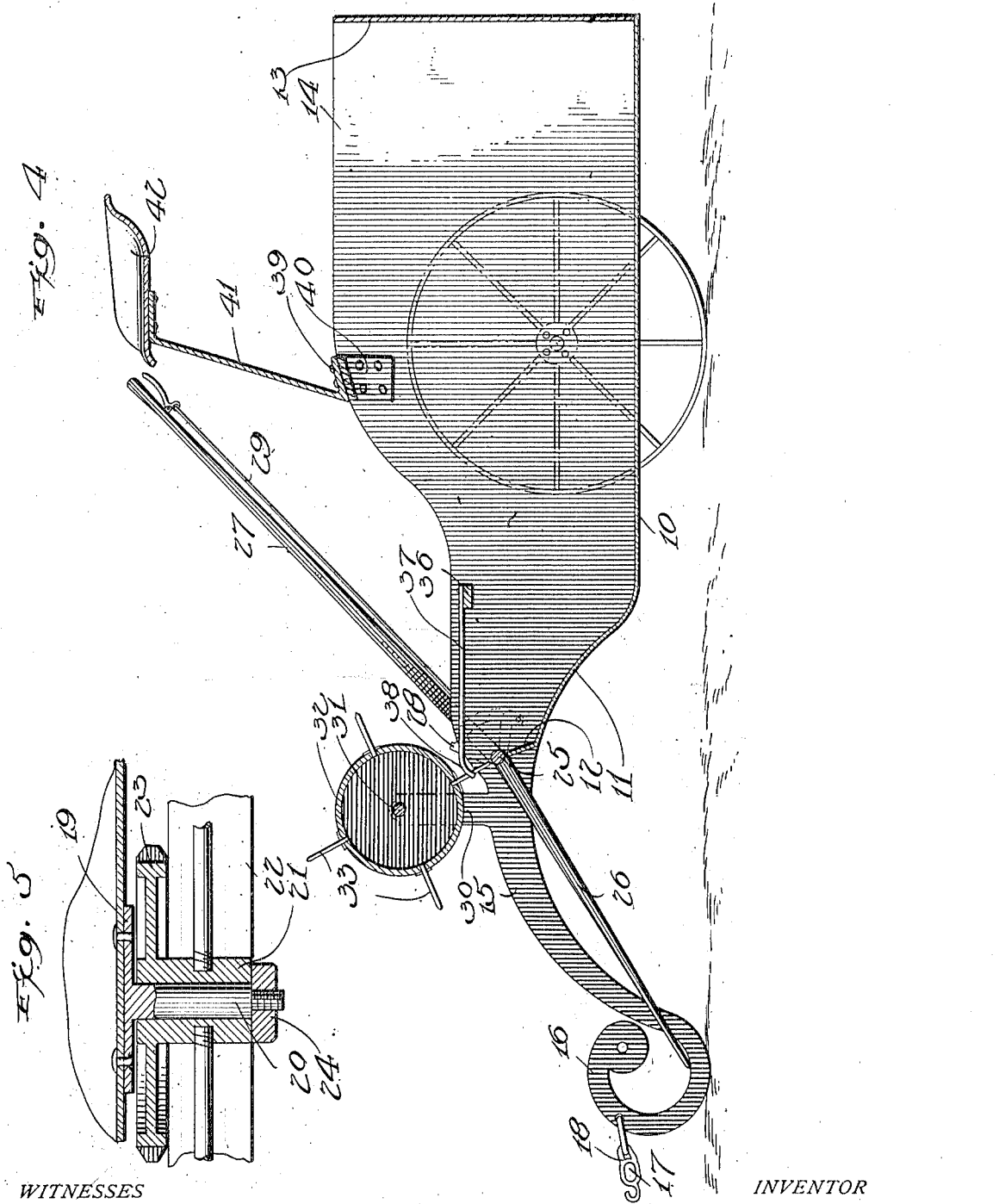

ROBERT W. MONK, OF MOBEETIE, TEXAS.

COTTON-BOLL HARVESTER.

1,105,915.   Specification of Letters Patent.   Patented Aug. 4, 1914.

Application filed July 13, 1912. Serial No. 709,230.

*To all whom it may concern:*

Be it known that I, ROBERT W. MONK, a citizen of the United States of America, residing at Mobeetie, in the county of Wheeler and State of Texas, have invented certain new and useful Improvements in Cotton-Boll Harvesters, of which the following is a specification, reference being had therein to the accompanying drawing.

This invention relates to harvesting machinery, and has special reference to a cotton harvester designed to remove the cotton bolls from plants.

The principal object of the invention is to improve and simplify the general construction of cotton harvesters.

The second object of the invention is to provide a novel arrangement, in a cotton harvester, for clearing the picking fork.

The third object of the invention is to provide a novel arrangement of the means for clearing the picking fork in combination with means for clearing the teeth of the last mentioned device.

With the above and other objects in view, the invention consists in general of certain novel arrangements of details and combinations of parts hereinafter fully described, illustrated in the accompanying drawings, and specifically claimed.

In the accompanying drawings, like characters of reference indicate like parts in the several views, and:—Figure 1 is a plan view of a harvester constructed in accordance with this invention. Fig. 2 is a partial side elevation of one side of such a harvester. Fig. 3 is a partial side elevation of the opposite side of such a harvester. Fig. 4 is a longitudinal vertical section through such a harvester. Fig. 5 is a detailed section showing a certain sprocket and shaft arrangements on the harvester.

In the carrying out of this invention, there is provided a body consisting of a bottom 10 upwardly and outwardly curved at the forward end as at 11, and terminates at this end in a diagonally disposed front portion 12. Extending upwardly from the rear end of this bottom is a back 13 which preferably is somewhat higher than the forward end. The sides of this body are indicated at 14 and are continued forward in a downwardly curved portion 15 terminated in a ground engaging reversing portion 16 on each side. To these reversed portions are secured the swingle trees 17 by means of the attaching links 18. The rear portion of the device has secured at each side, a plate 19 wherefrom extends a shaft 20 on which is mounted the hub 21 of a wheel 22. On one of these hubs there is formed a sprocket 23 and the wheel is secured on the shaft 20 by a suitable nut 24. Extending across the body between the sides, and journaling in the said sides is a shaft 25 wherefrom extends a series of forwardly and downwardly inclined pointed teeth 26. This shaft 25 is of sufficient height to pass over the tops of all of the cotton plants and the teeth 26 come sufficiently close to the ground to insure the stripping of the lowermost bolls. The shaft 25 extends outwardly through one side and on this outwardly extending end is secured a latch lever 27 which works over a quadrant 28, the latch lever carrying the usual latch mechanism 29. By this means the forward ends of the teeth may be raised or lowered as desired. Extending upwardly from each side of the body is a standard 30 and between these standards extends a rotatable shaft 31 whereon is fixed a drum 32 provided with a plurality or series of projecting teeth 33. These teeth are so arranged that they pass close to the teeth 26 when the drum is rotated. Upon this shaft 31 is also fixed a sprocket 34 which is connected by means of a chain 35 with the sprocket 23 so that when the device is drawn forward by the horses attached to it, the picker drum will be rotated.

In order to clear the teeth of the picker drum from any adhering cotton, there is provided a cross bar 36 which extends from side to side of the body and is located to the rear of the shaft 25 close to which the teeth 33 pass. Extending from this bar 36 is a series of teeth 37 provided with downwardly curved ends 38 and these ends are located slightly in advance of the shaft 25 and in such position that they pass between the teeth 33 as the drum 32 is rotated. From side to side of the body extends a bar 39 having downwardly turned ends 40 secured to the body sides, and projecting up from this bar centrally thereof there is a standard 41, and at the rear there is carried a driver's seat 42.

In the operation of this device the same is driven along the rows of cotton plants so that the teeth 26 pass through the plants and the cotton bolls are thereby stripped from the plants and carried up these teeth. Upon arriving at the upper end, the teeth 33 of the revolving drum 32 engage the bolls and move them backwardly into the body. At the same time the teeth 37 prevent these bolls from being carried around by the teeth 33 and act to clean the teeth. The plants themselves then strike the downwardly curved front 11 passing beneath the body to the rear.

There has thus been provided a simple and efficient device of the character described and for the purpose specified.

Having thus described the invention, what is claimed as new is:—

A cotton boll harvester comprising a body having a pair of sides, each side formed from a blank and comprising an enlarged body, an elongated downwardly curved arm extending from said body, said arm terminating in a reversed rolled portion, said sides adapted to carry a bottom and be carried by supporting wheels, said reversed rolled portions of said arms adapted to slide upon the surface of the ground to support the forward portion of said body, an integral standard extending from each of said curved arms and adapted to carry a rotating drum, and means carried by said arms for conveying cotton bolls up to said drum and into said body.

In testimony whereof I hereunto affix my signature in presence of two witnesses.

ROBERT W. MONK.

Witnesses:
R. R. McGREGOR,
BRANCH ANDERSON.